(12) United States Patent
Hayes et al.

(10) Patent No.: US 8,199,409 B2
(45) Date of Patent: Jun. 12, 2012

(54) ELECTROWETTING ELEMENTS AND OPTICAL DISPLAY DEVICES

(75) Inventors: Robert Hayes, Hong Kong (CN); Romaric Massard, Eindhoven (NL); Melanie Maria Hubertina Van De Weijer-Wagemans, Aarle-Rixtel (NL)

(73) Assignee: Samsung LCD Netherlands R&D Center B.V., Eindhoven (NL)

( * ) Notice: Subject to any disclaimer, the term of this patent is extended or adjusted under 35 U.S.C. 154(b) by 153 days.

(21) Appl. No.: 12/622,957

(22) Filed: Nov. 20, 2009

(65) Prior Publication Data

US 2010/0220380 A1 Sep. 2, 2010

Related U.S. Application Data

(63) Continuation of application No. PCT/EP2008/056211, filed on May 20, 2008.

(30) Foreign Application Priority Data

May 23, 2007 (GB) .................................. 0709897.3

(51) Int. Cl.
*G02B 1/06* (2006.01)
(52) U.S. Cl. ........................................ 359/665; 359/666
(58) Field of Classification Search .................. 359/290, 359/291, 665–666
See application file for complete search history.

(56) References Cited

U.S. PATENT DOCUMENTS 6,369,954 B1 * 4/2002 Berge et al. .................. 359/666
2008/0061712 A1 3/2008 Bleeker et al.

FOREIGN PATENT DOCUMENTS

| EP | 1777002 A1 | 4/2007 |
| WO | 03/071346 A1 | 8/2003 |
| WO | 2004/099846 A | 11/2004 |
| WO | 2005/098524 A1 | 10/2005 |
| WO | 2005/098797 A2 | 10/2005 |
| WO | 2007/057797 A1 | 5/2007 |

OTHER PUBLICATIONS

International Search Report from PCT/EP2008/056211, mailed on Oct. 16, 2008.
UK Search Report from GB0709897.3, date of search Aug. 10, 2007.

* cited by examiner

*Primary Examiner* — James Jones
(74) *Attorney, Agent, or Firm* — BainwoodHuang

(57) ABSTRACT

The present invention relates to reducing backflow in an electrowetting element for modifying a radiation beam characteristic. The electrowetting element comprises a first and a second fluid which are immiscible with each other and are switchable between a first configuration and a second configuration by application of a voltage across at least one of the first and second fluids. There is a tendency for backflow of the second fluid from the first configuration to the second configuration when the second fluid is switched to be provided in the first configuration. The electrowetting element comprises a backflow reducer arranged for reducing the backflow of the second fluid from the first configuration to the second configuration when the second fluid is switched to be provided in the first configuration.

24 Claims, 1 Drawing Sheet

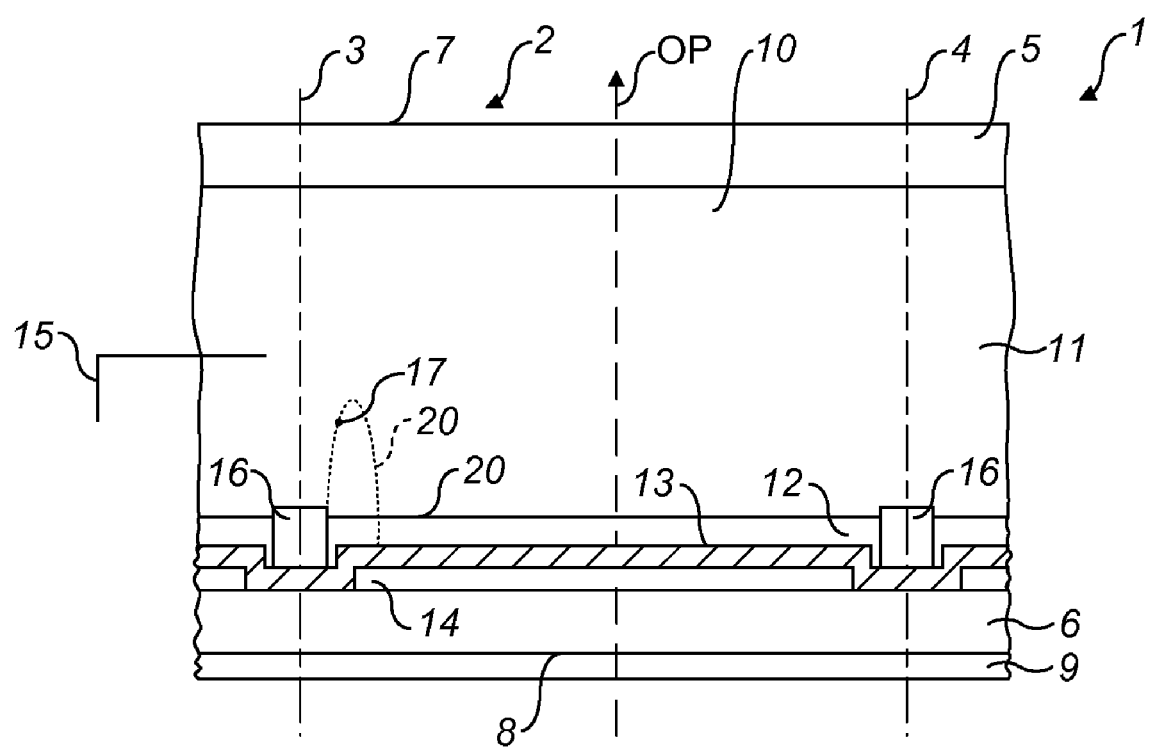

ELECTROWETTING ELEMENTS AND OPTICAL DISPLAY DEVICES

CROSS REFERENCE TO RELATED APPLICATIONS

This application is a continuation of International Patent Application No. PCT/EP2008/056211 filed on May 20, 2008 and entitled "IMPROVEMENTS IN RELATION TO ELECTROWETTING ELEMENTS AND OPTICAL DISPLAY DEVICES", the contents and teachings of which are hereby incorporated by reference in their entirety.

FIELD OF THE INVENTION

The present invention relates to electrowetting elements and optical display devices.

BACKGROUND

Electrowetting display devices are known, for example from international patent application no. WO 2003/071346. In an off state of such a display device an oil covers the area of a pixel of the display. In an on state the oil is retracted so as not to cover the pixel area. To switch the pixel into the on state a voltage is applied across the oil via an electrically conductive fluid immiscible with the oil, which exerts an electrostatic force on the conductive fluid, and to switch the pixel into the off state the voltage is switched off. Thus, for example, where the oil is coloured, a radiation beam passing through the pixel when in the off state passes through the oil and is imparted with colour, but does not pass through the oil with the pixel in the on state, and so its colour remains substantially unchanged.

A disadvantage of this display device is that when a voltage is applied to switch the pixel to the on state, the on state is not maintained. This results in poor quality images provided by the display device, especially over longer periods of time when the on state of pixels needs to be sustained.

It is an object of the present invention to reduce the cause of this disadvantage.

SUMMARY

In accordance with an aspect of the present invention there is provided an electrowetting element for modifying a radiation beam characteristic, said electrowetting element comprising a first and a second fluid which are immiscible with each other and are switchable between a first configuration and a second configuration by application of a voltage across at least one of the first and second fluids, there being a tendency for backflow of the second fluid from the first configuration to the second configuration when the second fluid is switched to be provided in the first configuration, wherein the electrowetting element comprises a backflow reducer arranged for reducing the backflow of the second fluid from the first configuration to the second configuration when the second fluid is switched to be provided in the first configuration.

In devising the present invention, the phenomenon of backflow has been identified and a backflow reducer is provided to reduce and preferably eliminate backflow. When the voltage is switched on, the fluids initially adopt the first configuration; without the voltage applied the fluids adopt the second configuration. In the first configuration, with a voltage applied across the second fluid, between the first fluid and an electrode beneath the second fluid, the second fluid is retracted. However, backflow occurs, in which the second fluid tends to flow back from the first configuration to eventually adopt the second configuration in which the second fluid is not retracted, despite continuous application of the voltage to provide the first configuration. This phenomenon is herein referred to using the term "backflow". Due to backflow, disadvantageously, a desired optical effect which would be provided in a radiation beam by the second fluid being in the first configuration is not maintained. Instead, an undesired optical effect corresponding to the second fluid being in the second configuration, or in an intermediate configuration between the first and second configurations is obtained. The present invention reduces and preferably eliminates such detrimental optical effects so that desired beam characteristics, such as a particular colour, can be accurately obtained and sustained over a prolonged period of time.

The backflow reducer described herein is arranged for reducing the backflow and includes any means capable of reducing the backflow described. In some embodiments, the backflow reducer may be arranged outside of the first and second fluids, whereas in other embodiments at least one of the first and second fluids includes the backflow reducer. Preferably, the invention does not relate to reducing the backflow by controlling the voltage applied to the electrowetting element.

In embodiments of the present invention, the backflow reducer is arranged to reduce said backflow when, by continuous application of a voltage across at least one of said first and second fluids, the second fluid is switched to be provided in the first configuration. Backflow can thus be reduced or preferably prevented without needing to apply measures which might interfere with switching of the fluids, such as changing the applied voltage.

Preferably, the backflow reducer is arranged to modify interfacial tension properties of an interface between said first and second fluids. Further preferably, the backflow reducer is arranged to modify surface tension properties of at least one of said first and second fluids. Modifying interfacial tension and surface tension properties at the interface and/or of the bulk of the first and second fluids may reduce backflow by changing the interaction of the first and second fluids with each other, and with other parts of the electrowetting element, for example walls or a hydrophobic layer, explained further below.

Preferably, the backflow reducer is arranged to modify electrical properties of at least one of said first and second fluids. Further preferably, the backflow reducer is arranged to modify electrical properties of at least one of said first and said second fluids at said interface between said first and second fluids. Modifying the electrical properties of the first and/or second fluids, in the bulk of the first or second fluids, and/or at the interface, may reduce backflow by advantageously reducing or preventing a flow of ions from one fluid into the other fluid, for example from the first fluid into the second fluid. Further, modifying these electrical properties may affect a screening effect of additive molecules in one of the first and second fluids, with respect to an electric field applied across the fluids, as explained below.

The backflow reducer preferably includes a compound with a polarity arranged to reduce backflow. This polarity may be such that the molecule of the compound has approximately no overall polarity. However, different regions of the molecule may be polarised, differently, due to the presence and positioning of electronegative and/or electropositive atoms in the molecule. The different polarisations of these regions cancel each other out across the whole molecule to provide approximately no overall polarity. Provision of such an approximately non-polar compound seems to advantageously counter the causes of backflow, as explained further below.

Preferably, the backflow reducer is arranged to include a compound with a stereochemistry arranged to reduce said backflow. As explained below, the stereochemistry of the compound in the second fluid seems to affect the extent of backflow by determining a spatial configuration formed when ions coordinate to the compound of the backflow reducer. By controlling the stereochemistry of this compound, the causes of backflow may advantageously be countered.

In preferred embodiments the backflow reducer includes a dye. Thus, the backflow reducer may reduce backflow and also impart colour into radiation passing through a fluid including the dye. This imparting of colour into the radiation is caused by the dye absorbing certain wavelengths of the radiation interacting with the dye molecules; thus the dye filters the radiation. Introduction of an additive into the second fluid, to provide a desired optical effect, such as a colour provided by a dye, may cause backflow. With the dye arranged to reduce backflow, the cause of backflow by the presence of the dye is reduced and preferably eliminated.

A backflow reducer according to the invention, such as a dye, may be used in many envisaged electrowetting cell constructions for use in an electrowetting display device. Such a backflow reducer can be used in display constructions that have one or more adjacent electrowetting elements. For example, in an electrowetting system with three adjacent electrowetting elements, the second fluid of each of three adjacent electrowetting elements may be dyed with a different coloured dye, for example, magenta, cyan and yellow, so that the beam may be imparted with a plurality of different colours by differently switching the three electrowetting elements. Use of three dyes which each reduce backflow allows different coloured radiation to be provided separately or in combination with reduced negative effects of backflow; thus realising a full colour display. The magenta, cyan and orange dyes described below may be used to provide such a full colour display.

In preferred embodiments, the dye includes an anthraquinone dye having the general formula:

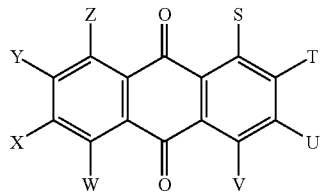

wherein any of S, T, U, V, W, X, Y, Z is any functional group.

Further preferably, T, U, X and Y are H and any of S, V, W, Z is H, OH, an aromatic group, an aliphatic group, an aromatic ester, an aliphatic ester having the general formula:

—COO—(CH$_2$)$_{n1}$—CH$_3$, an aromatic amine or an alkyl amine, wherein the alkyl group of each of the alkyl ester and the alkyl amine is optionally branched, and n1=1 to 20, preferably n1=4 to 16 and further preferably n1=8 to 12.

In a preferred embodiment, any of S, V, W, Z is an alkyl amine having the general formula:

—NH—(CH$_2$)$_{n2}$—CH$_3$, wherein n2=1 to 20.

In a particular preferred embodiment, said anthraquinone dye has a formula selected from the group consisting of:

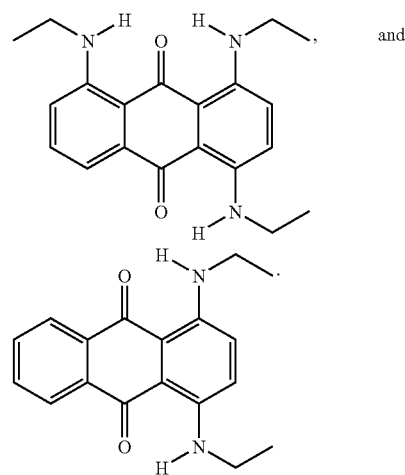

Preferably, n2=4 to 16 and in a preferred embodiment said anthraquinone dye has the formula:

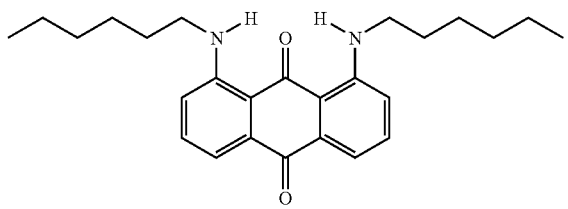

In other preferred embodiments, n2=8 to 12.

Further preferably, the dye includes an azo dye having the general formula:

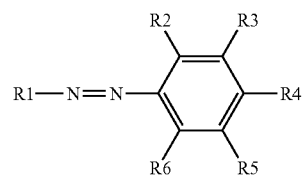

wherein any of R1, R2, R3, R4, R5 and R6 is any functional group.

Preferably, any of R1, R2, R3, R4, R5 and R6=H, an aliphatic group, an aromatic group, an optionally branched alkyl group, an optionally branched alkyl amine or an azo group.

In preferred embodiments, said azo dye has the formula:

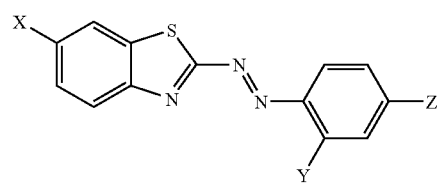

wherein X=a halide, Y=an optionally branched alkyl group and Z=an optionally branched alkyl amine.

Preferably, Y has the general formula:

—(CH$_2$)$_{n3}$CH$_3$, and Z has the general formula:

—NH—(CH$_2$)$_{n4}$—CH$_3$, wherein n3=0 to 20 and n4=1 to 20.

In one preferred embodiment, the azo dye has the formula:

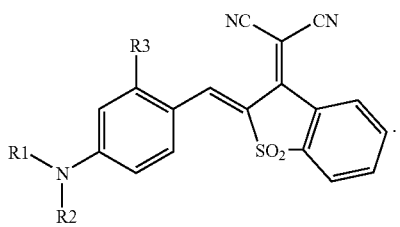

In yet further preferred embodiments, said dye includes a Foron dye.

Preferably, the Foron dye has the formula:

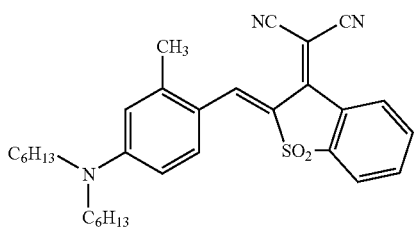

Alternatively, said Foron dye has the general formula:

wherein X=H or a halide. Preferably X=Br.

Also preferably, said Foron dye has the general formula:

wherein any of X and Y=H or a halide. Preferably, X and Y=Br.

In preferred embodiments, said Foron dye has the general formula:

wherein any of R1, R2 and R3 is an optionally branched alkyl chain.

Preferably, said Foron dye has the formula:

In preferred embodiments, at least one of said first and second fluids includes an electrolyte arranged to reduce backflow. A selected electrolyte in the first fluid may, as explained below, reduce and preferably eliminate backflow, by reducing or preventing the flow of ions from the first fluid into the second fluid and/or by interaction of electrolyte ions with the backflow reducer. Such a selected electrolyte may thus act as a backflow reducer in accordance with the invention.

Preferably, said electrolyte includes an alkali metal halide, wherein said alkali metal is selected from the group comprising: Li, Na and K, and said halide is selected from the group comprising: Cl, Br and I.

In alternative preferred embodiments, said electrolyte includes a diol having the general formula HO—(CH$_2$)$_{n5}$—OH, or a triol having the general formula HO—(CH$_2$)$_{n6}$—COH—(CH$_2$)$_{n7}$—OH, wherein any of n5, n6 and n7=1 to 20.

Preferably, said diol includes ethane-1,2-diol and said triol includes propane-1,2,3-triol.

Preferably, said backflow reducer includes a surfactant. Said backflow reducer preferably includes a cationic surfactant or an anionic surfactant. Alternatively, said anionic surfactant is preferably sodium dodecyl sulphate or an alkyl benzene sulphonate.

In a preferred embodiment, said cationic surfactant has the following general formula:

wherein each of R7, R8 and R9 is an optionally branched alkyl group.

Preferably, R7, R8 and R9 have the general formula —(CH$_2$)$_{n8}$—CH$_3$ and for any of R7, R8 and R9, n8=8 to 20.

Further preferably, for any of R7, R8 and R9, n8=12 to 16.

Using a surfactant to control electrical properties and/or the surface tension properties of the first and/or second fluids in the bulk of the liquids and/or at the interface 20, as well as interfacial tension properties, advantageously can reduce, or eliminate, backflow by changing whether, and if so, how, ions flow from the first fluid to the second fluid with the application of a voltage across the first and second fluids. Further details will be given later.

In preferred embodiments, said first fluid includes water. Also preferably, said second fluid includes at least one compound selected from the following group: an alkane, silicone oil and a bicyclo alkane. Preferably, said alkane is decane or hexadecane, and said bicyclo alkane is bicyclo-4.4.0-decane.

The choice of the compound forming the first and second fluids may be important in determining whether backflow occurs. In addition to the fluids needing to have the requisite properties so as to be suitably switched between the first and second configurations, the fluids may also have properties which reduce, or even prevent, a flow of ions from the first and second fluid; thus reducing or preventing backflow.

In accordance with a further aspect of the present invention, there is provided an optical display device for providing an image, wherein said optical display device includes at least one electrowetting element in accordance with the present invention.

Incorporating the electrowetting element of the invention in a display device provides that high quality images can be displayed to a viewer. The backflow reducer ensures that the quality of the image does not deteriorate over extended periods of time.

According to a yet further aspect of the invention, there is provided a backflow reducer arranged to reduce backflow of a fluid from a first configuration to a second configuration when the fluid is switched to provide the fluid in said first configuration, the fluid being switchable between said first and second configurations.

In another aspect of the invention, there is provided a fluid in accordance with the first or second fluid of the present invention, wherein said fluid includes a backflow reducer in accordance with the present invention.

In a further aspect of the invention, there is provided a method of reducing backflow in an electrowetting element, the electrowetting element being arranged for modifying a radiation beam characteristic and comprising a first and a second fluid which are immiscible with each other and are switchable between a first configuration and a second configuration by application of a voltage across at least one of the first and second fluids, there being a tendency for backflow of the second fluid from the first configuration to the second configuration when the second fluid is switched to be provided in the first configuration, wherein the method includes reducing the backflow of the second fluid from the first configuration to the second configuration when the second fluid is switched to be provided in the first configuration, by providing the electrowetting element with a backflow reducer.

In preferred embodiments, the backflow reducer may be arranged outside of the first and second fluids. In other preferred embodiments, at least one of the first and second fluids includes the backflow reducer.

According to a yet further aspect of the invention, there is provided a use of a backflow reducer to reduce backflow in an electrowetting element, the electrowetting element being arranged for modifying a radiation beam characteristic and comprising a first and a second fluid which are immiscible with each other and are switchable between a first configuration and a second configuration by application of a voltage across at least one of the first and second fluids, there being a tendency for backflow of the second fluid from the first configuration to the second configuration when the second fluid is switched to be provided in the first configuration, wherein the electrowetting element comprises the backflow reducer, the backflow reducer being arranged for reducing the backflow of the second fluid from the first configuration to the second configuration when the second fluid is switched to be provided in the first configuration.

In preferred embodiments, the backflow reducer may be arranged outside of the first and second fluids. In other preferred embodiments, at least one of the first and second fluids includes the backflow reducer.

Further features and advantages of the invention will become apparent from the following description of preferred embodiments of the invention, given by way of example only, which is made with reference to the accompanying drawing.

BRIEF DESCRIPTION OF THE DRAWINGS

FIG. 1 shows a schematic cross-section of part of an exemplary known display device.

DETAILED DESCRIPTION

FIG. 1 shows a schematic cross-section of part of an exemplary known display device 1. The display device includes a plurality of electrowetting elements 2, one of which is shown in the Figure. The lateral extent of the element is indicated in the Figure by the two dashed lines 3, 4. The electrowetting elements comprise a first support plate 5 and a second support plate 6. The support plates may be separate parts of each electrowetting element, but the support plates are preferably in common for the plurality of electrowetting elements. The support plates may be made for instance of glass or polymer and may be rigid or flexible.

The display device has a viewing side 7 on which an image formed by the display device can be viewed and a rear side 8. The first support plate faces the viewing side; the second support plate faces the rear side. The image is formed by light passing through each electrowetting element from the rear side 8 to the viewing side 7, where it is transmitted through the first support plate 5. Alternatively, the element may include a reflector for reflecting light, entering the element from the viewing side 7 back through the viewing side 7. Such a reflective element may alternatively be constructed with the second liquid 12, the electrode 14, the hydrophobic layer 13 and the walls 16 adjacent the first support plate 5. The image is built up of picture elements. Each picture element may contain a single electrowetting element. Alternatively, each picture element may contain a plurality of electrowetting elements, each electrowetting element forming a sub-picture element. The latter picture element may for example include three sub-picture elements provided with colour filters for red, green and blue, thereby forming an RGB picture element.

An illumination unit 9 may be attached to the rear side 8 of the plurality of electrowetting elements to provide backlighting of the electrowetting elements. The illumination unit may comprise a single white light source. It may also comprise a plurality of colour light sources e.g. for spectrum sequential operation of the display. The colours of the light sources may for example be yellow and blue. The light sources may be conventional light sources, such as fluorescent lamps or LEDs. The illumination unit may be of a conventional construction, such as disclosed for instance in international patent application WO 2006/011101.

A space 10 between the support plates is filled with a first fluid and a second fluid, for instance a first liquid 11 and a second liquid 12 respectively. The first liquid is immiscible with the second liquid. The first liquid is electrically conductive or polar, and may be a water or salt solution such as a solution of potassium chloride (KCl) in a mixture of water and ethyl alcohol. The first liquid is preferably transparent. The second liquid is electrically non-conductive and may for instance be an alkane like decane or hexadecane, (silicone) oil, or decaline (otherwise known as bicyclo-4.4.0-decane). A hydrophobic layer 13 is arranged on the electrode 14, facing the space 10. The layer may be an uninterrupted layer extending over a plurality of electrowetting elements or it may cover only the cross-section of one electrowetting element. The layer may be for instance an amorphous fluoropolymer layer such as AF1600 or other low surface energy polymers such as Parylene. The hydrophobic character causes the second liquid to adhere preferentially to the support plate 6.

Each electrowetting cell includes an electrode 14 arranged on the support plate 6. The electrode is separated from the liquids by an insulator which may be the hydrophobic layer 13. In general, the electrode has the same shape as the cross-section of the electrowetting element, but in other embodiments the electrode may have a different shape than the cross-section of the electrowetting element. A second electrode 15 is connected to the conductive first liquid 11. This electrode can be common to a series of electrowetting cells that share the first liquid, uninterrupted by walls. The electrodes on the support plate 6 are connected to an electrical terminal on the support plate by a matrix of printed wiring. The electrodes 14 and wiring are preferably transparent and made of e.g. indium tin oxide or reflecting (e.g. aluminium). The matrix may include switching elements such as transistors; in this case the matrix is called an active matrix.

The lateral extent of the second liquid 12 is constrained to one electrowetting element by walls 16 or hydrophilic areas that follow the cross-section of the electrowetting cell. Further details of the electrowetting cell and its manufacture are disclosed amongst others in international patent application WO 2005/098797.

The second liquid absorbs at least a part of the optical spectrum. The liquid may be transmissive for a part of the optical spectrum, forming a colour filter. For this purpose the liquid may be coloured by addition of pigment particles or dye. Alternatively, the liquid may be black, i.e. absorb substantially all parts of the optical spectrum.

When a nonzero voltage is applied between the electrodes 14, 15, electrostatic forces will move the first liquid 11 towards the electrode 14, thereby repelling the second liquid 12 from the area of the electrode 14 to the walls 16 surrounding the area of the electrode. The repelled liquid is schematically indicated by a dashed line 17. This action removes the second liquid from an optical path OP that runs from the rear side 8 to the viewing side 7 through the electrowetting element. In an embodiment where the element reflects light entering the viewing side 7 back out through the viewing side 7, this action removes the second liquid substantially from the path of the incident and reflected light. When the voltage is returned to zero, the second liquid flows back to cover the hydrophobic layer 13. In this way the second liquid forms an electrically controllable light switch whereby the first and second liquids 11, 12 are switchable between a first configuration of the liquids and a second configuration of the liquids. The first configuration corresponds with the position of the liquids 11, 12 when the second liquid 12 has the position indicated by dashed line 17. The second configuration corresponds with the position of the liquids 11, 12 when the second liquid 12 covers the hydrophobic layer 13.

In the above description of the electrowetting cell the second liquid 12 either covers the area of the electrode 14 or is removed from it. International patent application WO 2003/071346 discloses measures that allow the second liquid to cover the area of the electrode 14 only partially, thereby realizing so-called grey values.

Backflow may be observed in the display device 1 described above. With the nonzero voltage being continuously applied, without interruption, between the electrodes 14, 15 the first and second liquids 11, 12 may flow back from the first configuration to eventually adopt the second configuration.

Without wishing to be bound to any theory, it is believed that this backflow occurs because the second liquid 12 becomes charged or polarised during application of the nonzero voltage. This is unexpected because the second liquid 12 is non-polar. Indeed, backflow is not observed when the second liquid 12 comprises, for example, only decane. Additives in the second liquid 12 may thus lead to backflow. However, backflow is not exhibited for certain dyes dissolved in the second liquid 12.

Further, backflow may occur as a result of interactions between the first and second liquids at an interface 20 between the first and second liquids 11, 12. The position of the interface with the nonzero voltage applied corresponds with the dashed line 17. Thus, additives in the second liquid 12 which interact, by for example adsorption, with the interface 20 may cause, or reduce, backflow depending on their properties. The additives may modify electrical and/or surface tension properties of the first and second liquids 11, 12 both in the bulk of the liquid and at the interface 20, to reduce backflow. Modifying surface tension properties may affect how the liquids interact with each other and with other parts of the element, such as the walls 16 or the hydrophobic layer 13, to reduce backflow. Further such additives may modify interfacial tension properties at the interface 20.

During application of the nonzero voltage, it is believed that ions flow from the first liquid 11 into the second liquid 12; thus the second liquid 12 becomes charged and more strongly attracted to the surface of the hydrophobic layer 13 than the first liquid 11. With a zero voltage applied instead, this ion flow does not seem to occur. Thus, the energy of the electric field provided by application of the nonzero voltage appears to initiate the ion flow. When the second liquid 12 becomes sufficiently charged, the second liquid 12 preferentially adheres to the hydrophobic layer 13 and flows back across the hydrophobic layer 13. With continued application of the nonzero voltage, the second liquid 12 accumulates more charge, and the rate of backflow increases. Eventually, due to backflow, the liquids 11, 12 adopt the second configuration. In the absence of any backflow, the hydrophobic layer 13 would otherwise be covered by the first liquid 11 in the first configuration. This is because the first liquid 11 is charged.

The flow of ions into the second liquid 12, and hence charging of the second liquid 12, may be attributed to a polarity of an additive in the second liquid 12. With the application of the nonzero voltage, polar additive molecules are believed to orientate themselves with respect to the electric field created through the liquids. This orientation may be an alignment of the molecules with respect to other additive molecules and to the electric field. The polarity of the molecules in combination with such orientation appears to attract the ions from the first liquid 11 into the second liquid 12, and so that they tend to coordinate with the additive molecules. Indeed, when the zero voltage is restored, the second liquid 12 discharges by the ions flowing back into the first liquid 11. In fact, with the zero voltage applied over a prolonged period of time, the second liquid 12 does not become charged despite having a polar additive. On this basis, non-polar additive molecules do not appear to cause backflow, possibly because their orientation is not affected by application of the nonzero voltage.

Certain surfactant molecules may also influence the flow of ions into the second liquid 12. A surfactant would tend to migrate from the bulk of the first or second liquid 11, 12 to the interface 20, in order to adsorb to the interface 20 and thus with both the first and second liquids 11, 12. Factors of the surfactant such as the charge and size of the head group, and the size and any charge or polarity of the tail group, may influence backflow. In particular, it is believed that with the application of a non-zero voltage across the first and second liquid, such surfactant molecules are affected by the bias of the electric field applied as a consequence of the voltage, for example the surfactant molecules may align with each other and with respect to the direction of the applied electric field, which affects how the first and second fluids interact with each other at the interface with the nonzero voltage applied. Such alignment may, for certain surfactant molecules, reduce or prevent backflow. The surfactants may also interact with the interface at the point between the first liquid, the second liquid and the hydrophobic layer.

The flow of ions into the second liquid 12 may also be attributed to a stereochemistry of an additive in the second liquid 12. The ions flowing from the first liquid 11 to the second liquid 12 are believed to coordinate with the molecules of the additive. Thus, the stereochemistry of the additive molecules will determine the form and size of the spatial configuration of the additive molecules with the ions coordinated to them. This spatial configuration appears to affect whether backflow occurs, and, if backflow does occur, the rate of backflow.

The flow of ions into the second liquid 12 may further be attributed to the amount of charge carried by each ion and also to the spatial dimensions of such ions. These charge and dimensional properties may affect how the ions interact and coordinate with the additive molecules in the second liquid 12, by for example influencing polarity and/or spatial configuration properties of the additive molecules; thus affecting whether backflow occurs and, if so, the rate of backflow. The ions may be hydrogen ions, hydroxide ions, or ions from an electrolyte present in the first liquid 11.

Further, and again without wishing to be bound by any theory, the phenomenon of backflow may also be caused by an alignment of polar molecules in the first and/or second liquids 11, 12. For example, if the second liquid 12 includes a polar additive, the molecules of this additive may tend to align with each other and with respect to the electric field, when the nonzero voltage is applied. A relatively positively charged part of the additive molecule would be attracted towards the negative terminal of the electric field and a relatively negatively charged part of the additive molecule would be attracted towards the positive terminal of the electric field. Thus, an internal electric field is created in the second liquid 12, by the aligning of the additive molecules, which opposes the electric field applied by the nonzero voltage. Consequently, the internal field may be considered to counteract the electric field set up by application of the nonzero voltage; thus at least partially, or completely screening the first and or second liquids 11, 12 from the electric field applied by the nonzero voltage, so that the first and/or second liquids 11, 12 feel a reduced electric field. As a result, the second liquid 12 would tend to backflow.

In accordance with the present invention, a backflow reducer is provided to reduce and preferably eliminate backflow of a fluid from a first configuration to a second configuration, when the fluid is switched to provide the first configuration.

In an embodiment of the invention the display device 1 described above is provided. The second liquid 12 includes the backflow reducer so that backflow is reduced when the second liquid 12 is switched to provide the first fluid configuration by continuous application of the nonzero voltage. The backflow reducer may be arranged to modify the electrical properties of the second liquid 12. Further, the backflow reducer may modify electrical properties of at least one of the first and the second fluids at the interface 20. The backflow reducer may also modify surface tension properties of at least one of the first and second liquids 11, 12 and/or also modify interfacial tension properties at the interface 20.

Accordingly, the backflow reducer may include a compound with a polarity arranged to reduce backflow, for example a compound having approximately no polarity. Such a compound is believed not to cause ions to flow, due to electrostatic attraction, from the first liquid 11 into the second liquid 12 upon application of the nonzero voltage.

The second liquid 12 may also include a surfactant for interaction with the first and/or second liquids 11, 12, and in particular with the interface 20 to reduce, or preferably eliminate, backflow. A suitable surfactant may be an anionic surfactant, for example sodium dodecyl sulphate or an alkyl benzene sulphonate, having, for example, an alkali metal counterion such as $Na^+$.

Further examples of anionic surfactants useful herein include the conventional primary, branched-chain and random $C_{10}$-$C_{20}$ alkyl sulphates ("AS"), the $C_{10}$-$C_{18}$ secondary (2,3) alkyl sulphates of the formula $CH_3(CH_2)_x(CHOSO_3^- M^+)CH_3$ and $CH_3(CH_2)_y(CHOSO_3^- M^+)CH_2CH_3$ where x and (y+1) are integers of at least about 7, preferably at least about 9, and M is a water-solubilizing cation, especially sodium, unsaturated sulphates such as oleoyl sulphate, the $C_{10}$-$C_{18}$ alkyl alkoxy sulphates ("$AE_xS$"; especially EO 1-7 ethoxy sulphates), $C_{10}$-$C_{18}$ alkyl alkoxy carboxylates (especially the EO 1-5 ethoxycarboxylates), sulphated $C_{10}$-$C_{18}$ alkyl polyglycosides, and $C_{12}$-$C_{18}$ alpha-sulphonated fatty acid esters.

According to the present invention suitable alkyl or hydroxyalkyl alkoxylated sulphates for use herein are of the formula $RO(A)_mSO_3M$, wherein R is an unsubstituted $C_{11}$-$C_{24}$ alkyl or hydroxyalkyl component, preferably a $C_{12}$-$C_{20}$ alkyl or hydroxyalkyl, more preferably a $C_{12}$-$C_{18}$ alkyl or hydroxyalkyl component, A is an ethoxy or propoxy group, m is from 1 to 15, more preferably from 1 to 10, and M is H or a cation which may be selected from metal cations such as sodium, potassium, lithium, calcium, magnesium, ammonium or substituted ammonium. Specific examples of substituted ammonium cations include methyl-, dimethyl-, trimethyl-ammonium and quaternary ammonium cations such as tetramethyl-ammonium, dimethyl piperidium and cations derived from alkanolamines, e.g. monoethanolamine, diethanolamine and triethanolamine and mixtures thereof. Exemplary surfactants are $C_{12}$-$C_{18}$ alkyl polyethoxylate (2.25) sulphate, $C_{12}$-$C_{18}$ alkyl polyethoxylate (3) sulphate and $C_{12}$-$C_{18}$ alkyl polyethoxylate (4) sulphate wherein M is selected from sodium or potassium. $C_{12}$-$C_{14}$ alkyl sulphate which has been ethoxylated with an average of from 0.5 to 4 moles of ethylene oxide per molecule is especially preferred.

Other suitable anionic surfactants for use herein include salts (e.g. alkali metal and ammonium salts) of $C_{11}$-$C_{24}$, preferably $C_{12}$-$C_{20}$ alkyl sarcosinates, linear alkylaryl sulphonates, particularly linear alkyl benzene sulphonates, primary or secondary alkane sulphonates, alkene sulphonates such as α-olefin sulphonates, ether sulphonates, sulphonated polycarboxylic acids, oxyalkane sulphonates (fatty acid isethionates), acylamino alkane sulphonates (taurides), alkyl glycerol sulphonates and sulphates, fatty acyl glycerol sulphonates, fatty oleoyl glycerol sulphonates, and any mixtures thereof. Also suitable as anionic surfactants are fatty acids and the salts thereof, particularly monocarboxylic fatty acids and the salts thereof.

A suitable surfactant in accordance with alternative embodiments of the present invention is a cationic surfactant, for example a tertiary ammonium alkyl having the general formula:

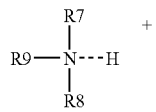

where R7, R8 and R9 have the general formula $-(CH_2)_{n8}-CH_3$ and for any of R7, R8 and R9, n8=8 to 20, preferably n8=12 to 16. A halide counterion may be provided, for example, Cl$^-$ or Br$^-$. A further example of a suitable surfactant includes cetyl ($C_{16}$) trimethyl ammonium bromide (CTAB).

In further embodiments, suitable cationic surfactants are those having one long chain hydrocarbyl group, for example including the ammonium surfactants such as alkyldimethylammonium halogenides and surfactants having the formula:

$$[R^2(OR^3)_y][R^4(OR^3)_y]_2R^5N^+X^-$$

wherein $R^2$ is an alkyl or alkyl benzyl group having from about 8 to about 18 carbon atoms in the alkyl chain, each $R^3$ is selected from the group consisting of $CH_2CH_2-$, $-CH_2CH(CH_3)-$, $-CH_2CH(CH_2OH)-$, $-CH_2CH_2CH_2-$, and mixtures thereof; each $R^4$ is selected from the group consisting of $C_1$-$C_4$ alkyl, $C_1$-$C_4$ hydroxyalkyl, benzyl ring structures formed by joining the two $R^4$ groups, $-CH2CHOH-CHOHCOR^6CHOHCH_2OH$ wherein $R^6$ is any hexose or hexose polymer having a molecular weight less than about 1000 and hydrogen when y is not 0; $R_5$ is the same as $R^4$ or is an alkyl chain wherein the total number of carbon atoms of $R_2$ plus $R_5$ is not more than about 18; each y is from about 0 to about 10 and the sum of the y values is from 0 to about 15; and X is any compatible anion.

Preferred cationic surfactants are the water soluble quaternary ammonium compounds which have the formula:

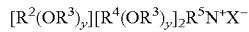

wherein $R^1$ is a $C_8$-$C_{16}$ alkyl, each of $R^2$, $R^3$ and $R^4$ is independently $C_1$-$C_4$ alkyl, $C_1$-$C_4$ hydroxy alkyl, benzyl and $(C_2H_4O)_xH$ where x has a value of from 1 to 5 and X is an anion. Not more than one of the $R_2$, $R_3$ or $R_4$ should be benzyl.

The preferred alkyl chain length for $R_1$ is from $C_{12}$-$C_{15}$, particularly where the alkyl group is a mixture of chain lengths derived from coconut or palm kernel fat or is derived synthetically by olefin build up or OXO alcohols synthesis. Preferred groups for the $R^2$, $R^3$ and $R^4$ are methyl and hydroxyethyl groups and the anion X may be selected from halide, methosulphate, acetate and phosphate ions.

Examples of suitable quaternary ammonium compounds for use herein are: coconut trimethyl ammonium chloride or bromide; coconut methyl dihydroxyethyl ammonium chloride or bromide; decyl trimethyl ammonium chloride; decyl dimethyl hydroxyethyl ammonium chloride or bromide; $C_{12}$-$C_{15}$ dimethyl hydroxyethyl ammonium chloride or bromide; coconut dimethyl hydroxyethyl ammonium chloride or bromide; myristyl trimethyl ammonium methyl sulphate; lauryl dimethyl benzyl ammonium chloride or bromide; lauryl dimethyl (ethoxy)$_4$ ammonium chloride or bromide and choline esters.

Further, the backflow reducer may be a compound with molecules having a stereochemistry arranged to prevent backflow. Such a molecule is believed to have a spatial configuration which reduces backflow when it is coordinated with ions from the first liquid 11. The backflow reducer may include a mixture of different compounds selected according to their polarity and/or stereochemical properties to reduce backflow.

A selected electrolyte for the first liquid 11 may, either alone or in combination with a compound having certain polarity and/or stereochemical properties, reduce backflow. This reduction in backflow may be due to ions of the electrolyte having a particular charge and/or spatial dimensions. The electrolyte is preferably selected to be non-charged, miscible with water and to have a surface tension similar to that of water. For example, the electrolyte may be a diol having the general formula: $HO-(CH_2)_{n5}-OH$, or a triol having the general formula: $HO-(CH_2)_{n6}-COH-(CH_2)_{n7}-OH$. Preferably, n 5, n6 and n7=1 to 20; the diol may for example be ethylene glycol (ethane-1,2-diol) and the triol may be glycerol (propane-1,2,3-triol). Additionally, or alternatively, the electrolyte may be an alkali metal halide where the alkali metal may be Li, Na, or K and the halide may be Cl, Br or I; examples thus include NaCl and KCl. Further, where the first liquid 11 is substantially not ionic, for example where the first liquid 11 is pure ethylene glycol, backflow is reduced because, it is believed, there are no ions in the first liquid 11 to flow into the second liquid 12.

In further embodiments of the present invention, the backflow reducer includes a dye, or a mixture of dyes. The dye may, for example, be an azo dye, an anthraquinone dye, or a Foron dye. Examples of Foron dyes are known from "Colour Chemistry", Zollinger, ISBN 3-527-28352-8, the content of which is included herein by way of reference. Such Foron dyes may be, but are not limited to, within the scope of the present invention, a nitro compound, a quinoline compound, an aminophthoquinone compound or a methine compound. Derivatives of such anthraquinone dyes, azo dyes and Foron dyes according to the present invention are also envisaged in further embodiments according to the present invention. Using such a dye, a compound present in the second liquid 12 reduces backflow and imparts colour into the radiation beam passing along the optical path OP and through the second liquid 12.

Exemplary dye compounds are described below. Their backflow reduction properties will be explained, with reference to their properties, including their polarity and stereochemical properties. Structures of the dye molecules are illustrated schematically below. The stereochemistry of such structures is not limited to that shown; it is to be appreciated that molecular structures of the dyes having different stereochemistry are within the scope of the invention.

The term n is be used in relation to specified ranges of carbon atoms present in, for example, an alkyl group. It is to be appreciated that for such ranges, all intermediate integer values of n between the specified values of n should be described herein also. For example, if n=5 to 10, it is understood that n may be 5, 6, 7, 8, 9 or 10.

The examples described below are an anthraquinone dye, an azo dye or a Foran™ dye.

Where the dye includes an anthraquinone dye, the dye has the general formula:

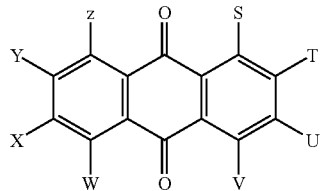

where any of S, T, U, V, W, X, Y, Z is any functional group.

T, U, X and Y may be H and any of S, V, W, Z may be H, OH, an aromatic group, an aliphatic group, an aromatic ester, an aliphatic ester having the general formula:

—COO—$(CH_2)_{n1}$—$CH_3$, an aromatic amine or an alkyl amine, where the alkyl group of each of the alkyl ester and the alkyl amine is optionally branched, and $n1=1$ to 20, preferably $n1=4$ to 16, and further preferably $n1=8$ to 12.

Where any of S, V, W, Z is an alkyl amine, the alkyl amine has the general formula:

—NH—$(CH_2)_{n2}$—$CH_3$, wherein $n2=1$ to 20, preferably $n2=4$ to 16 and further preferably $n2=8$ to 12.

In further embodiments, any of T, U, X and Y may be a different functional group than H, for example, any of T, U, X and Y may be OH, an aromatic group, an aliphatic group, an aromatic ester, an aliphatic ester having, for example, the general formula —COO—$(CH_2)_{n1}$—$CH_3$ described above, an aromatic amine or an alkyl amine having, for example, the general formula —NH—$(CH_2)_{n2}$—$CH_3$ described above. In such embodiments, if any of T, U, X and Y include an alkyl group, this alkyl group is optionally branched. Further, in such embodiments, any of S, V, W and Z may be a functional group according to those described previously for anthraquinone dyes, for example an optionally branched alkyl amine.

Where the dye includes an azo dye, the dye has the general formula:

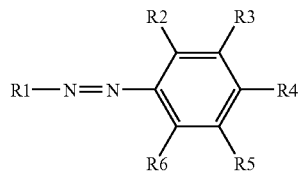

where any of R1, R2, R3, R4, R5 and R6 is any functional group.

Any of R1, R2, R3, R4, R5 and R6 may be H, an aliphatic group, an aromatic group, an optionally branched alkyl group, an optionally branched alkyl amine or an azo group.

In embodiments, the azo dye has the formula:

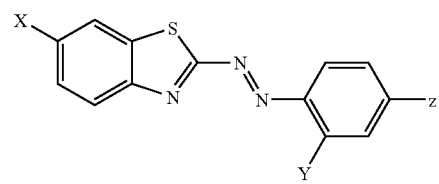

where X=a halide, Y=an optionally branched alkyl group and Z=an optionally branched alkyl amine. Preferably, X=Cl, Y has the general formula:
—$(CH_2)_{n3}$—$CH_3$, and Z has the general formula:
—NH—$(CH_2)_{n4}$—$CH_3$, where $n3=0$ to 20 and $n4=1$ to 20.

The dye may be a Foron dye. The Foron dye may have the general formula:

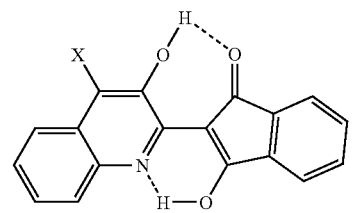

where X=H or a halide.

Alternatively, the Foron dye may have the general formula:

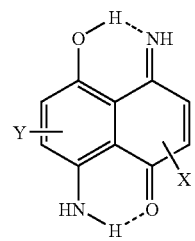

where any of X and Y=H or a halide.

Further alternatively, the Foron dye has the general formula:

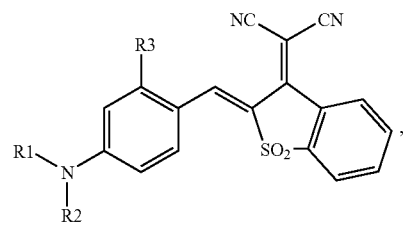

where any of R1, R2 and R3 is an optionally branched alkyl group.

EXAMPLE 1

Dye (1) is 1,4,8-tris(ethylamino) anthraquinone and has the following formula:

17

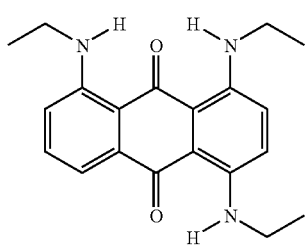

(1)

This dye is an anthraquinone dye which provides a cyan colouring in the second liquid 12. This dye may be synthesised according to the following exemplary reaction:

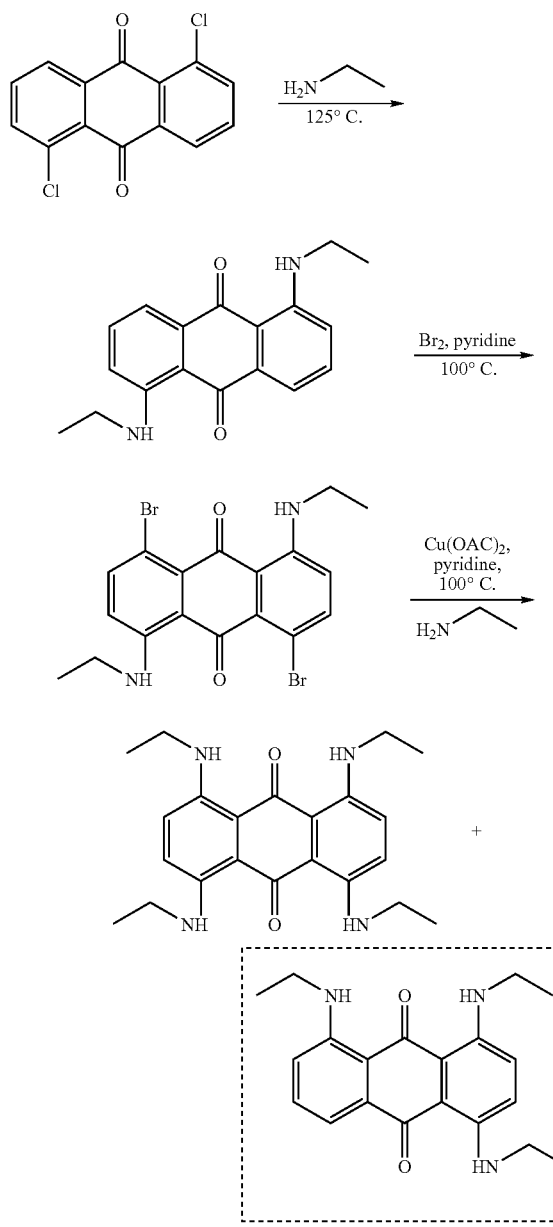

18

EXAMPLE 2

Dye (2) is 1,4-bis(ethylamino) anthraquinone and has the following formula:

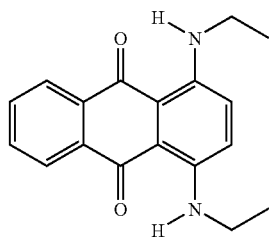

(2)

This dye is an anthraquinone dye and provides a blue colouring in the second liquid 12. This dye may be synthesised according to the following exemplary reaction:

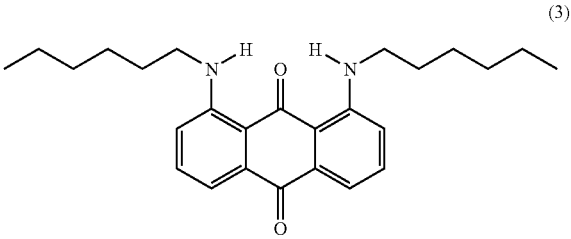

EXAMPLE 3

Dye (3) has the following formula:

(3)

This dye is an anthraquinone dye and provides a magenta colouring in the second liquid 12. The dye may be synthesised according to the following reaction:

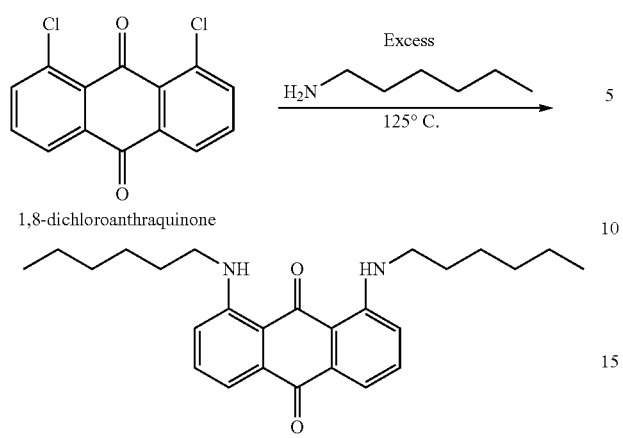

1,8-dichloroanthraquinone

EXAMPLE 4

Dye (4) has the following formula:

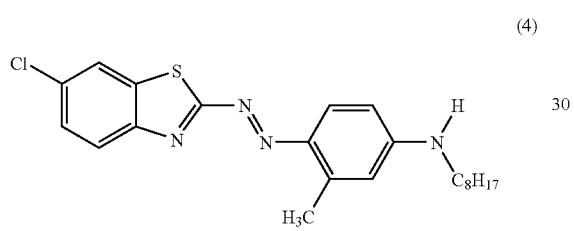

This dye is an azo dye and provides an orange colouring in the second liquid 12.

The dye may be synthesised according to the following reaction:

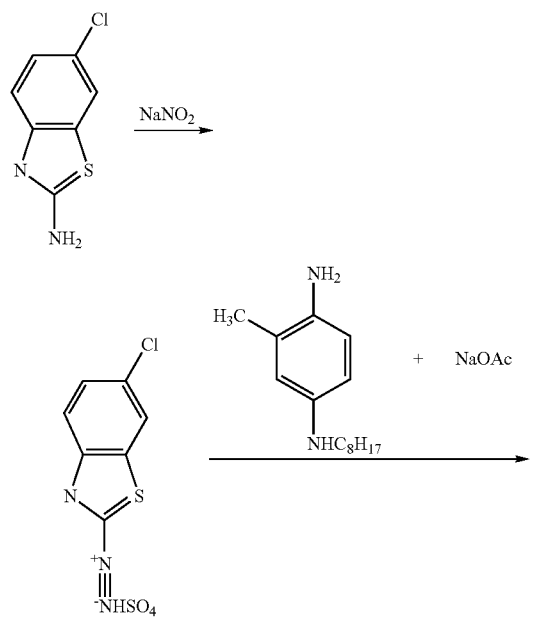

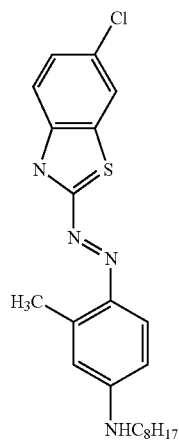

EXAMPLE 5

Dye (5) is the Foron dye Foron Yellow SE-FL (CI Disperse Yellow 42) which is in the nitro chemical class and which has the following formula:

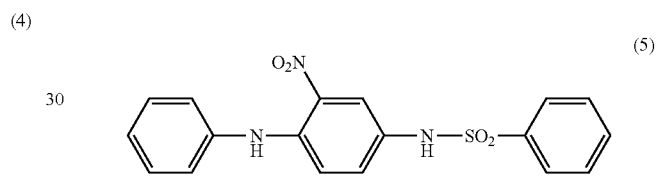

This dye provides a yellow colouring in the second liquid 12, and is available, for example, under the commercial name "Disperse Yellow GWL" from Global Colours, Inc. located at 1455 President Street, Glendale Heights, Ill. 60139, USA.

EXAMPLE 6

Dye (6) is the Foron dye Foron Yellow SE-3GL (CI Disperse Yellow 64) which is in the quinoline chemical class and which has the following formula:

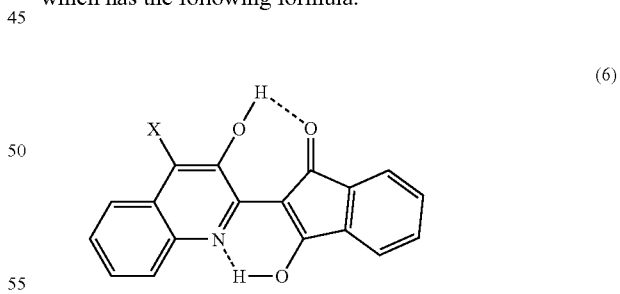

and X=Br.

This dye provides a yellow colouring in the second liquid 12 and is available, for example, under the commercial name "Disperse Yellow 3G" from Global Colours, Inc. located at 1455 President Street, Glendale Heights, Ill. 60139, USA.

EXAMPLE 7

Dye (7) is the Foron dye Foron Brilliant Blue (CI Disperse Blue 20) which is in the aminophthoquinone chemical class and which has the following formula:

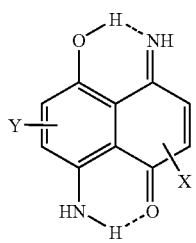

(7)

and X and Y=Br.

This dye provides a blue colouring in the second liquid 12 and is available, for example, under the commercial name "Disperse Blue GFL" from Sinochem Ningbo Imp. And Exp. Co., Ltd located at 21 Jiangxia St., Ningbo, Zhejiang, China.

EXAMPLE 8

Dye (8) is the Foron dye Foron Brilliant Blue (CI Disperse Blue 354) which is in the methine chemical class and which has the following formula:

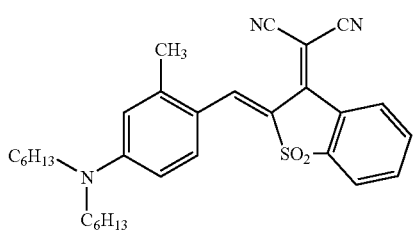

(8)

This dye provides a blue colouring in the second liquid 12 and is available, for example, under the commercial name "Kayalon Polyester Brilliant Blue FR-S" from Nippon Kayaku Co Ltd located at Tokyo Fujimi Bldg., 11-2, Fujimi 1-chome, Chiyoda-ku, Tokyo 102-8172, Japan.

Molecular regions of dyes (1), (2) and (3) are polarised, due to the electronegative nitrogen and oxygen atoms. Such regions may depend on positioning of the electronegative atoms in the molecule influenced by rotation of parts of the molecule around the chemical bond axes. For dye (1), across the entire structure of each of molecule the polarised regions cancel out, making each molecule approximately non-polar overall. When dye (1) is dissolved in the second liquid 12, minimal, or no backflow is observed. Dye (2), however, has a high overall polarisation and thus when dissolved in the second liquid 12, strong backflow is observed in comparison with dye (1). Dye (3) has an intermediate overall molecular polarity, which is higher than the polarity of dye (1), but lower than the polarity of dye (2). Consequently, with dye (3) dissolved in the second liquid 12, intermediate backflow is observed, which is greater than the amount of backflow for dye (1), but less than the amount of backflow for dye (2). Dye (4) has an overall low polarity and therefore with dye (4) dissolved in the second liquid 12, little, or no backflow occurs. Thus, the polarity of the dye dissolved in the second liquid 12 affects whether backflow occurs. It is believed that the stereochemistry of these dye molecules may also contribute to whether backflow is caused, and, if backflow does occur, to the rate of backflow.

Dyes (5), (6), (7) and (8) represent different examples of Foron dyes which appear to exhibit backflow reducing properties when dissolved in the second liquid 12. As will be appreciated, each of dyes (5), (6), (7) and (8) differ in structure from each other, having different polar regions and different stereochemistry; their backflow reducing properties vary in accordance with such polarity and stereochemical properties.

As explained above, the rate of backflow may be affected by the electrolyte present in the first liquid 11. Table 1 below gives data indicative of the rate of backflow, namely the time taken for the second liquid 12 to backflow so as to cover half the area of the hydrophobic layer 13, for the exemplary dyes (1) and (2) when the electrolyte is either $CaCl_2$ or ethylene glycol. This data is obtained from experiments performed using the display device of the invention where the hydrophobic layer 13 comprises a layer of AF1600 having a thickness of 800 nm and the walls being formed of a layer of SU8 with a thickness of 4 μm, both thicknesses being measured along a direction parallel the optical path OP. A nonzero voltage of −35V is applied and the pixel area has dimensions of 160 μm by 160 μm.

TABLE 1

| | Time Taken | |
| --- | --- | --- |
| Dye Molecule | Electrolyte = $CaCl_2$ | Electrolyte = EG |
| (1) | 1 second | 10 seconds |
| (2) | 8 minutes | >15 minutes |

The above embodiments are to be understood as illustrative examples of the invention. Further embodiments of the invention are envisaged. For example, display device 1 may have a different construction from that described above using the Figure. Also, the backflow reducer may alternatively be provided in the first liquid 11 or in other parts of the electrowetting element and/or the display device. Pigment particles, suspended in the first and/or second fluids may also be used to backflow reduction. Backflow may also be reduced or preferably eliminated by changing the construction of the electrowetting element, for example parameters such as the volume of the first and/or second liquids, the viscosity of the first and/or second fluids, the size of the element and the space containing the liquids, the height of the walls, the interfacial tension of the interface between the two liquids, the concentration of a backflow reducer in one of the liquids and a configuration of filling the element with the liquids. Further, impurities in the first and or second liquid, perhaps introduced with an additive such as a dye, may cause backflow. Thus, cleaning of the liquids to reduce impurities may also reduce backflow.

Further, a backflow reducer may be applied to any system providing a fluid which is switchable between first and second configurations, by application of electrostatic forces, and which exhibits backflow.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of reducing backflow in an electrowetting element, said electrowetting element being arranged for modifying a radiation beam characteristic and comprising a first and a second fluid which are immiscible with each other and are switchable between a first configuration and a second configuration by application of a voltage across at least one of the first and second fluids, there being a tendency for backflow of the second fluid from the first configuration to the second configuration when the second fluid is switched to be provided in the first configuration,
    wherein the method includes reducing the backflow of the second fluid from the first configuration to the second configuration when the second fluid is switched to be provided in the first configuration, by providing the electrowetting element with a backflow reducer.

2. A use of a backflow reducer to reduce backflow in an electrowetting element, said electrowetting element being arranged for modifying a radiation beam characteristic and comprising a first and a second fluid which are immiscible with each other and are switchable between a first configuration and a second configuration by application of a voltage across at least one of the first and second fluids, there being a tendency for backflow of the second fluid from the first configuration to the second configuration when the second fluid is switched to be provided in the first configuration,
    wherein the electrowetting element comprises the backflow reducer, the backflow reducer being arranged for reducing the backflow of the second fluid from the first configuration to the second configuration when the second fluid is switched to be provided in the first configuration.

3. An electrowetting element for modifying a radiation beam characteristic, said electrowetting element comprising a first and a second fluid which are immiscible with each other and are switchable between a first configuration and a second configuration by application of a voltage across at least one of the first and second fluids, there being a tendency for backflow of the second fluid from the first configuration to the second configuration when the second fluid is switched to be provided in the first configuration,
    wherein the electrowetting element comprises a backflow reducer arranged for reducing the backflow of the second fluid from the first configuration to the second configuration when the second fluid is switched to be provided in the first configuration.

4. An electrowetting element according to claim 3, wherein the backflow reducer is arranged outside of the first and second fluids.

5. An electrowetting element according to claim 3, wherein at least one of the first and second fluids includes the backflow reducer.

6. An electrowetting element according to claim 3, wherein said backflow reducer is arranged to reduce said backflow when, by continuous application of a voltage across at least one of said first and second fluids, the second fluid is switched to be provided in the first configuration.

7. An electrowetting element according to claim 3, wherein said backflow reducer is arranged to modify interfacial tension properties of an interface between said first and second fluids.

8. An electrowetting element according to claim 3, wherein said backflow reducer is arranged to modify surface tension properties and/or electrical properties of at least one of said first and second fluids.

9. An electrowetting element according to claim 3, wherein said backflow reducer is arranged to modify electrical properties of at least one of said first and said second fluids at an interface between said first and second fluids.

10. An electrowetting element according to claim 3, wherein said backflow reducer includes a compound with a polarity and/or a stereochemistry arranged to reduce backflow.

11. An electrowetting element according to claim 5, wherein said backflow reducer includes a dye.

12. An electrowetting element according to claim 11, wherein said dye includes an anthraquinone dye having the general formula:

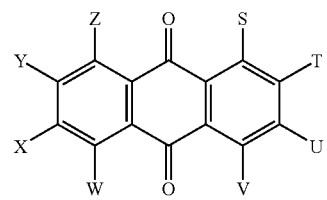

wherein any of S, T, U, V, W, X, Y, Z is any functional group, or
    wherein T, U, X and Y are H and any of S, V, W, Z is H, OH, an aromatic group, an aliphatic group, an aromatic ester, an aliphatic ester having the general formula:

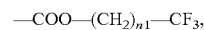

an aromatic amine or an alkyl amine, wherein the alkyl group of each of the alkyl ester and the alkyl amine is optionally branched, and n1=1 to 20, 4 to 16 or 8 to 12.

13. An electrowetting element according to claim 12, wherein any of S, V, W, Z is an alkyl amine having the general formula:

wherein n2=1 to 20, and optionally said anthraquinone dye has a formula selected from the group consisting of:

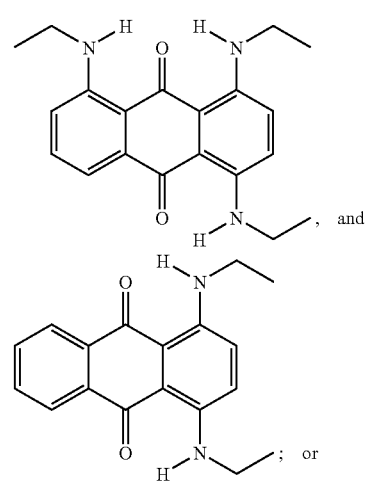

wherein n2=4 to 16, and optionally said anthraquinone dye has the formula:

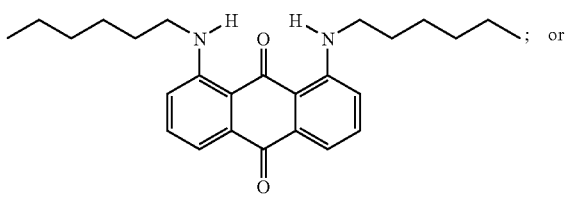 ; or wherein n2=8 to 12.

14. An electrowetting element according to claim 11, wherein said dye includes an azo dye having the general formula:

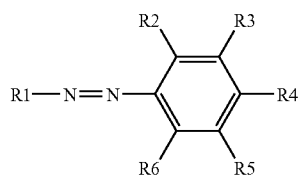

wherein any of R1, R2, R3, R4, R5 and R6 is any functional group, or
wherein any of R1, R2, R3, R4, R5 and R6=H, an aliphatic group, an aromatic group, an optionally branched alkyl group, an optionally branched alkyl amine or an azo group,
wherein optionally said azo dye has the formula:

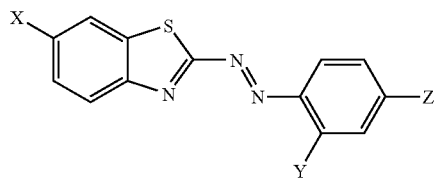

wherein X=a halide, Y=an optionally branched alkyl group and Z=an optionally branched alkyl amine, and
wherein optionally Y has the general formula:

—(CH$_2$)$_{n3}$—CH$_3$, and Z has the general formula:

—NH—(CH$_2$)$_{n4}$—CH$_3$, wherein n3=0 to 20, n4=1 to 20, and
wherein optionally said azo dye has the formula:

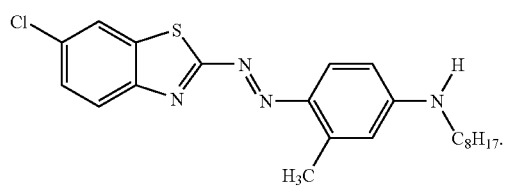

15. An electrowetting element according to claim 11, wherein said dye includes a Foron dye,
wherein optionally said Foron dye has a formula selected from the group consisting of:

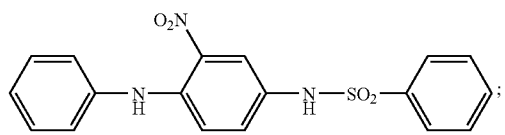

the general formula:

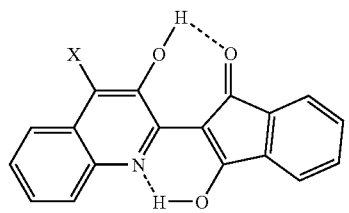

wherein X=H, a halide, or Br;
the general formula:

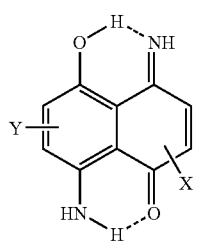

wherein any of X and Y=H or a halide, or
wherein X and Y=Br;
the general formula:

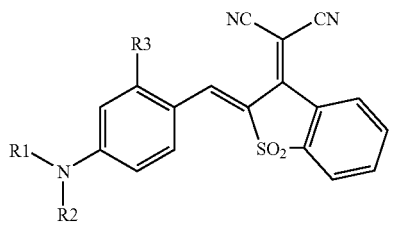

wherein any of R1, R2 and R3 is an optionally branched alkyl group; and
the formula:

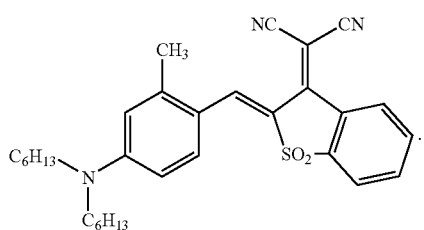

16. An electrowetting element according to claim 5, wherein at least one of said first and second fluids includes an electrolyte arranged to reduce backflow, wherein said electrolyte optionally includes an alkali metal halide, wherein said alkali metal is selected from the group comprising: Li, Na and K, and said halide is selected from the group comprising: Cl, Br and I, wherein said electrolyte optionally includes a diol having the general formula HO—$(CH_2)_{n5}$—OH, or a triol having the general formula HO—$(CH_2)_{n6}$—COH—$(CH_2)_{n7}$—OH, wherein any of n5, n6 and n7=1 to 20, and wherein said diol optionally includes ethane-1,2-diol and said triol includes propane-1,2,3-triol.

17. An electrowetting element according to claim 5, wherein said backflow reducer includes a surfactant which is optionally an anionic surfactant which is optionally sodium dodecyl sulphate or an alkyl benzene sulphonate, or the surfactant is optionally a cationic surfactant which optionally has the following general formula:

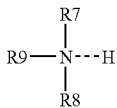

wherein each of R7, R8 and R9 is an optionally branched alkyl group, and wherein optionally R7, R8 and R9 have the general formula —$(CH_2)n_8$-$CH_3$ and for any of R7, R8 and R9, n8=8 to 20 or 12 to 16.

18. An electrowetting element according to claim 3, wherein said first fluid includes water.

19. An electrowetting element according to claim 3, wherein said second fluid includes at least one compound selected from the following group: an alkane, silicone oil and a bicyclo alkane.

20. An electrowetting element according to claim 19, wherein said alkane is decane or hexadecane, and said bicyclo alkane is bicyclo-4.4.0-decane.

21. An optical display device for providing an image, wherein said optical display device includes at least one electrowetting element in accordance with claim 3.

22. A method according to claim 1, wherein the first configuration is adopted when the voltage is applied and the second configuration is adopted without the voltage applied, and the tendency for backflow of the second fluid from the first configuration to the second configuration occurs when the voltage is applied.

23. A use of the backflow reducer according to claim 2, wherein the first configuration is adopted when the voltage is applied and the second configuration is adopted without the voltage applied, and the tendency for backflow of the second fluid from the first configuration to the second configuration occurs when the voltage is applied.

24. An electrowetting element according to claim 3, wherein the first configuration is adopted when the voltage is applied and the second configuration is adopted without the voltage applied, and the tendency for backflow of the second fluid from the first configuration to the second configuration occurs when the voltage is applied.

* * * * *

UNITED STATES PATENT AND TRADEMARK OFFICE
CERTIFICATE OF CORRECTION

PATENT NO. : 8,199,409 B2
APPLICATION NO. : 12/622957
DATED : June 12, 2012
INVENTOR(S) : Robert Hayes et al.

Page 1 of 1

It is certified that error appears in the above-identified patent and that said Letters Patent is hereby corrected as shown below:

Claim 17, Column 27, Lines 19-22, " 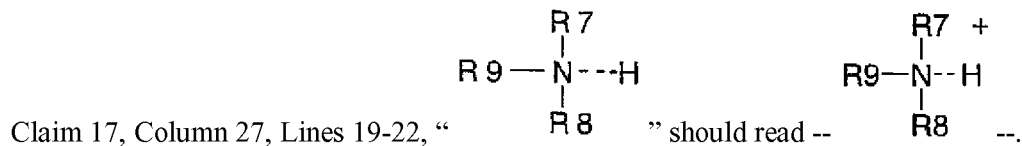 " should read -- -- .

Signed and Sealed this
Thirty-first Day of July, 2012

David J. Kappos
*Director of the United States Patent and Trademark Office*